May 5, 1970

R. L. RESCH 3,510,749

POWER FREQUENCY MULTIPLICATION USING NATURAL
SAMPLED QUAD PULSE WIDTH MODULATED INVERTER

Filed Feb. 23, 1968

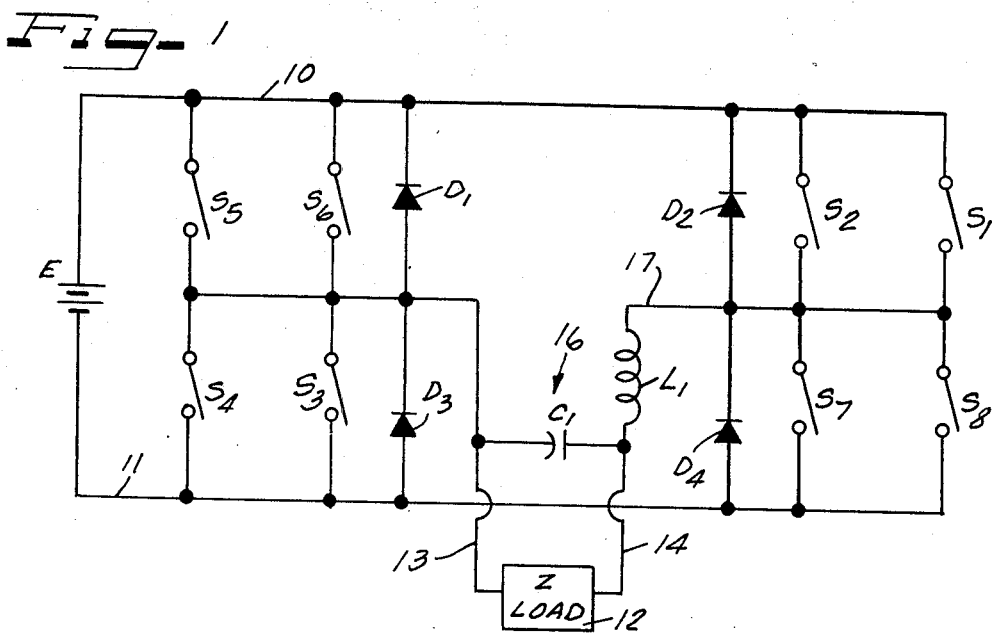

Fig-1

TABLE I

LOGIC LOCKOUT SEQUENCE TO
PREVENT CIRCUITS ACROSS SOURCE E

+ OUTPUT $S_1$ $S_2$ $S_5$ $S_8$ – BLANK $S_1$ $S_2$
$S_3$ $S_4$ $S_5$ $S_8$ – BLANK $S_3$ $S_4$
$S_3$ $S_4$ $S_7$ $S_6$ – BLANK $S_3$ $S_4$
$S_1$ $S_2$ $S_7$ $S_6$ – BLANK $S_1$ $S_2$

0 OUTPUT $S_1$ $S_2$ $S_5$ $S_6$ – NO BLANK
$S_3$ $S_4$ $S_7$ $S_8$ – NO BLANK
$S_3$ $S_2$ $S_5$ $S_8$ – BLANK $S_3$ $S_8$
$S_3$ $S_2$ $S_7$ $S_6$ – BLANK $S_3$ $S_7$

– OUTPUT $S_3$ $S_2$ $S_5$ $S_6$ – BLANK $S_5$ $S_6$
$S_3$ $S_2$ $S_7$ $S_8$ – BLANK $S_7$ $S_8$
$S_1$ $S_4$ $S_5$ $S_6$ – BLANK $S_5$ $S_6$
$S_1$ $S_4$ $S_7$ $S_8$ – BLANK $S_7$ $S_8$

0 OUTPUT $S_1$ $S_4$ $S_7$ $S_6$ – BLANK $S_1$ $S_6$
$S_1$ $S_4$ $S_5$ $S_8$ – BLANK $S_1$ $S_5$

INVENTOR.

ROBERT J. RESCH

BY *Kill, Sherman, Meroni, Gross & Simpson* ATTORNEYS

INVENTOR.
ROBERT J. RESCH

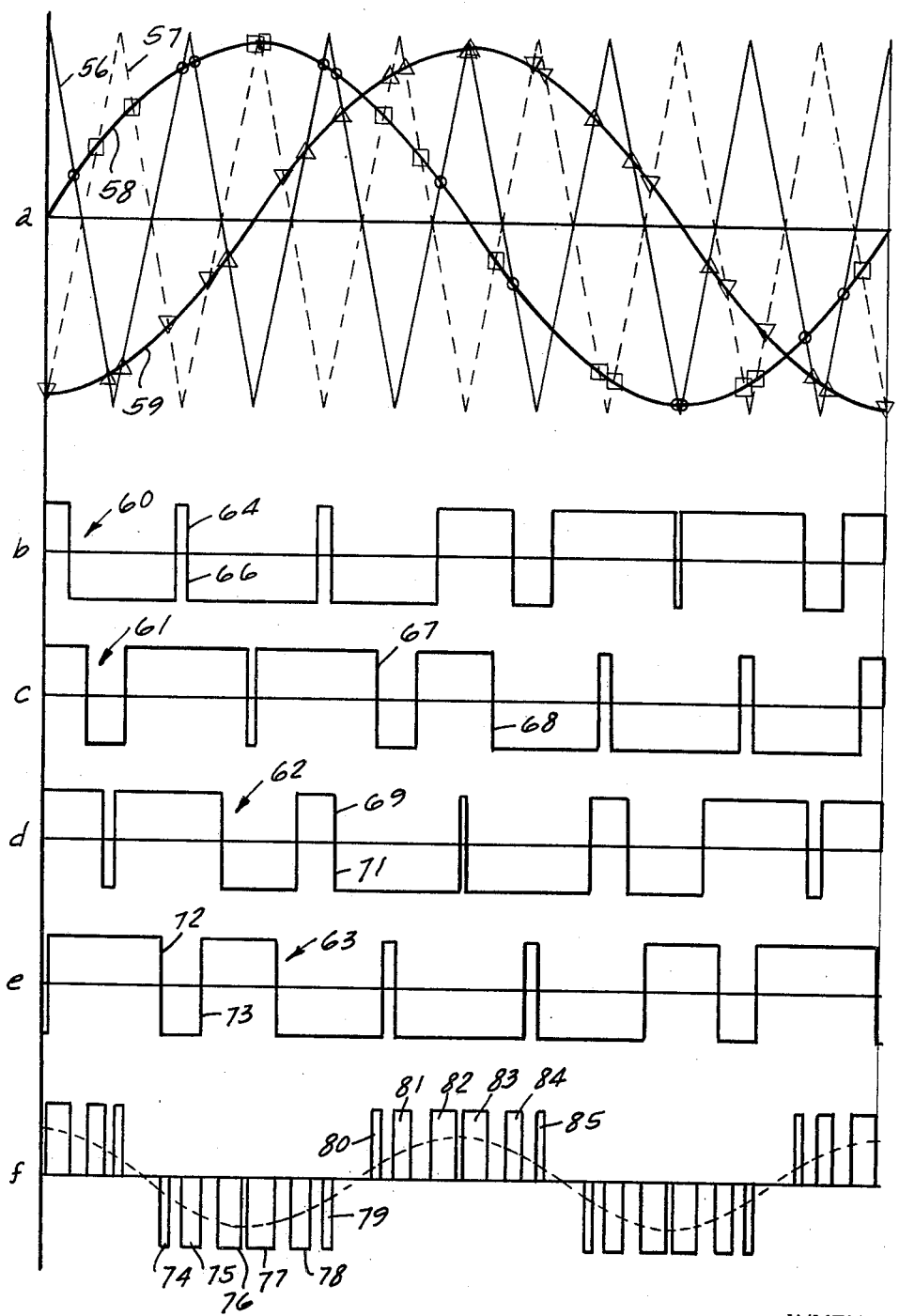

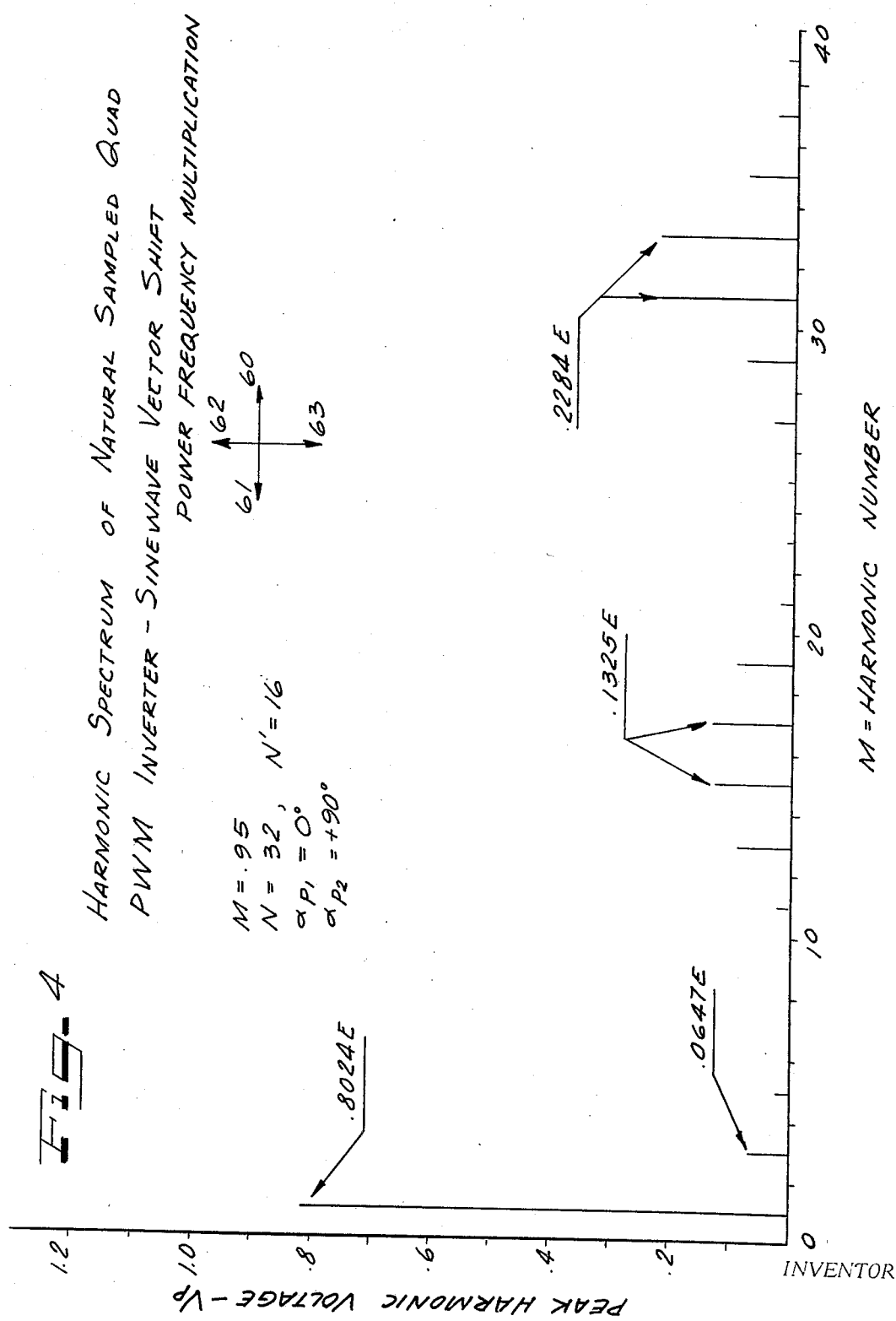

United States Patent Office 3,510,749
Patented May 5, 1970

3,510,749
POWER FREQUENCY MULTIPLICATION USING NATURAL SAMPLED QUAD PULSE WIDTH MODULATED INVERTER
Robert J. Resch, Euclid, Ohio, assignor to TRW Inc., Cleveland, Ohio, a corporation of Ohio
Filed Feb. 23, 1968, Ser. No. 707,754
Int. Cl. H02m 1/12, 7/44
U.S. Cl. 321—9                                  11 Claims

ABSTRACT OF THE DISCLOSURE

A static inverter capable of inverting a direct current source to an alternating current output voltage which utilizes a switching arrangement between the direct current source and the load comprising a high frequency triangle and its complement for the carrier frequency and two reference sinewaves which are vectorially shifted by 90° and which are compared with the triangle carrier frequency signals in operational amplifiers to control switches in the inverter.

CROSS REFERENCES TO RELATED APPLICATIONS

This application is related to the copending application entitled "Naturally Sampled Quad Pulse With Modulated Inverter," Ser. No. 708,236.

BACKGROUND OF THE INVENTION

Field of invention

This invention relates to a static inverter capable of inverting a direct current source to an alternating current output voltage which uses a triangular shaped wave and its complement and a pair of reference sinewaves which are phased 90° relative to each other in combination with a logic circuit to control a plurality of power switches, which in turn switch the direct current source to the load.

BRIEF SUMMARY OF THE INVENTION

A modulator which utilizes a pair of triangular shaped waves which are spaced from each other by 180° in combination with a pair of reference sinewaves which are vectorially shifted by 90° are compared with the triangle carrier frequency waves in operational amplifiers to produce four naturally sampled pulse width modulated waveforms. The four naturally sampled pulse width modulated waveforms thus produced are utilized to control power switches in a bridge circuit to convert direct current source to alternating current output.

The static inverter according to this invention is lightweight and uses standard semi-conductors such as transistors, gate control switches and silicon controlled rectifiers as the power switches.

Further objects, features and advantages of the present invention will be readily apparent from the following detailed description of certain preferred embodiments thereof taken in conjunction with the accompanying drawings.

BRIEF DESCRIPTION OF THE DRAWINGS

FIG. 1 is a schematic view illustrating the static inverter according to this invention;

FIGS. 3a through 3f illustrate waveforms in the various portions of the invention; and FIG. 4 illustrates the harmonic spectrum.

Figure 2A:
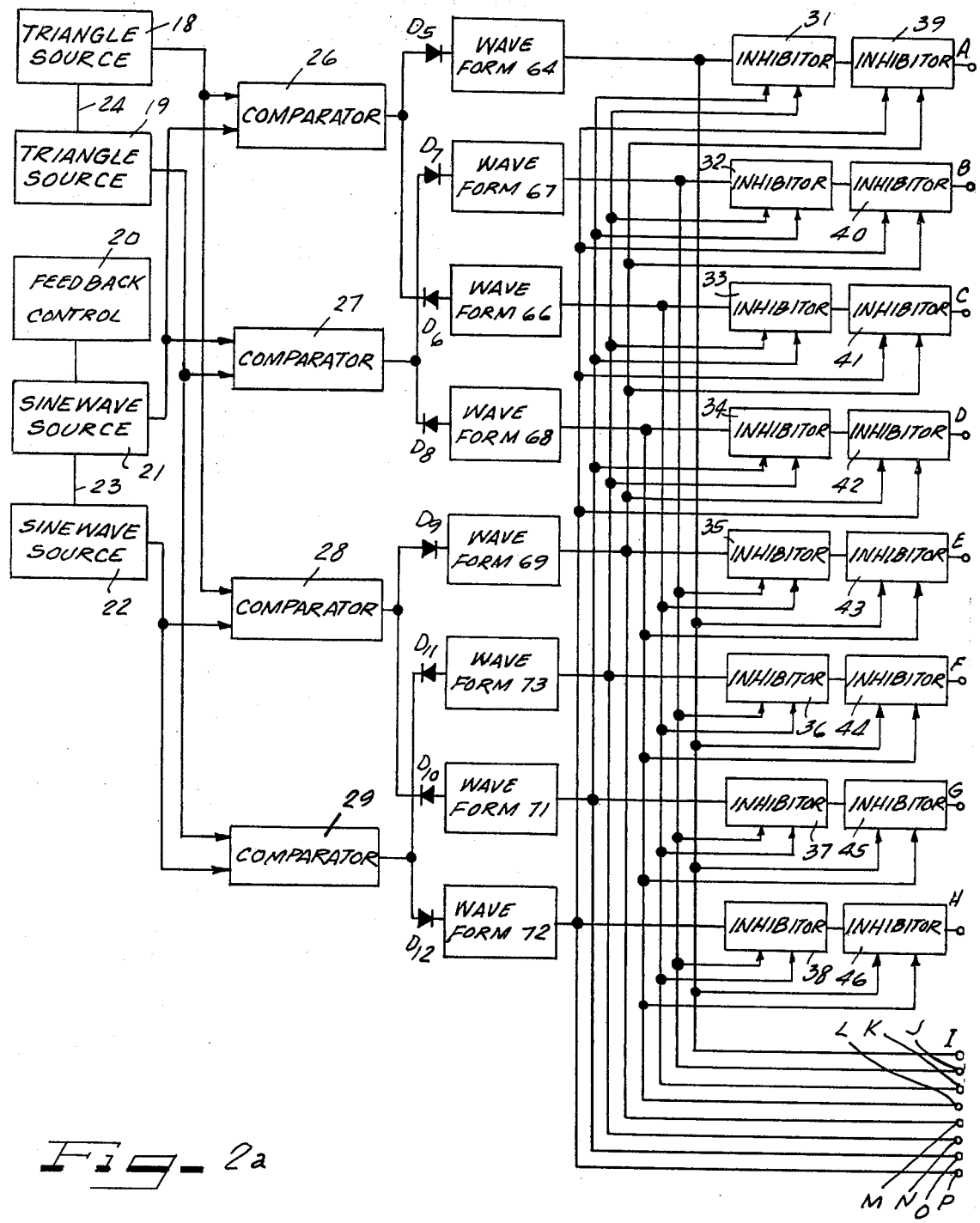
FIGS. 2a and 2b are block diagrams of the basic switch logic required for this invention.

Table I shows the logic lockout sequence to prevent short circuits across the direct current voltage source.

DETAILED DESCRIPTION OF THE INVENTION

FIG. 1 illustrates a voltage source E which has a plus and negative terminal connected respectively to leads 10 and 11. A load 12 is connected to terminals 13 and 14 and a filter 16 comprising a capacitor $C_1$ and the inductance $L_1$ are connected across the load 12 between leads 13 and 14. A lead 17 is connected to one side of the inductance $L_1$. A plurality of power switches $S_1$–$S_8$ are connected between the leads 10, 11, 13 and 17, as shown in the figure. For example, power switches $S_5$ and $S_6$ are connected between leads 10 and 13. A diode $D_1$ is also connected between these leads with its cathode connected to the positive terminal of the voltage source E. Power switches $S_7$ and $S_8$ are connected between leads 11 and 17 and a diode $D_4$, connected to the negative terminal of the voltage source E is also connected between leads 11 and 17. Power switches $S_1$ and $S_2$ are connected between leads 10 and 17 and a diode $D_2$ with its cathode connected to the positive terminal of the voltage source E is also connected between these leads. Powers switches $S_3$ and $S_4$ are connected between leads 11 and 13 and a diode $D_3$ is connected between these leads. Power switches $S_3$ and $S_4$ are the negative terminal of the voltage source E.

Figure 2B:
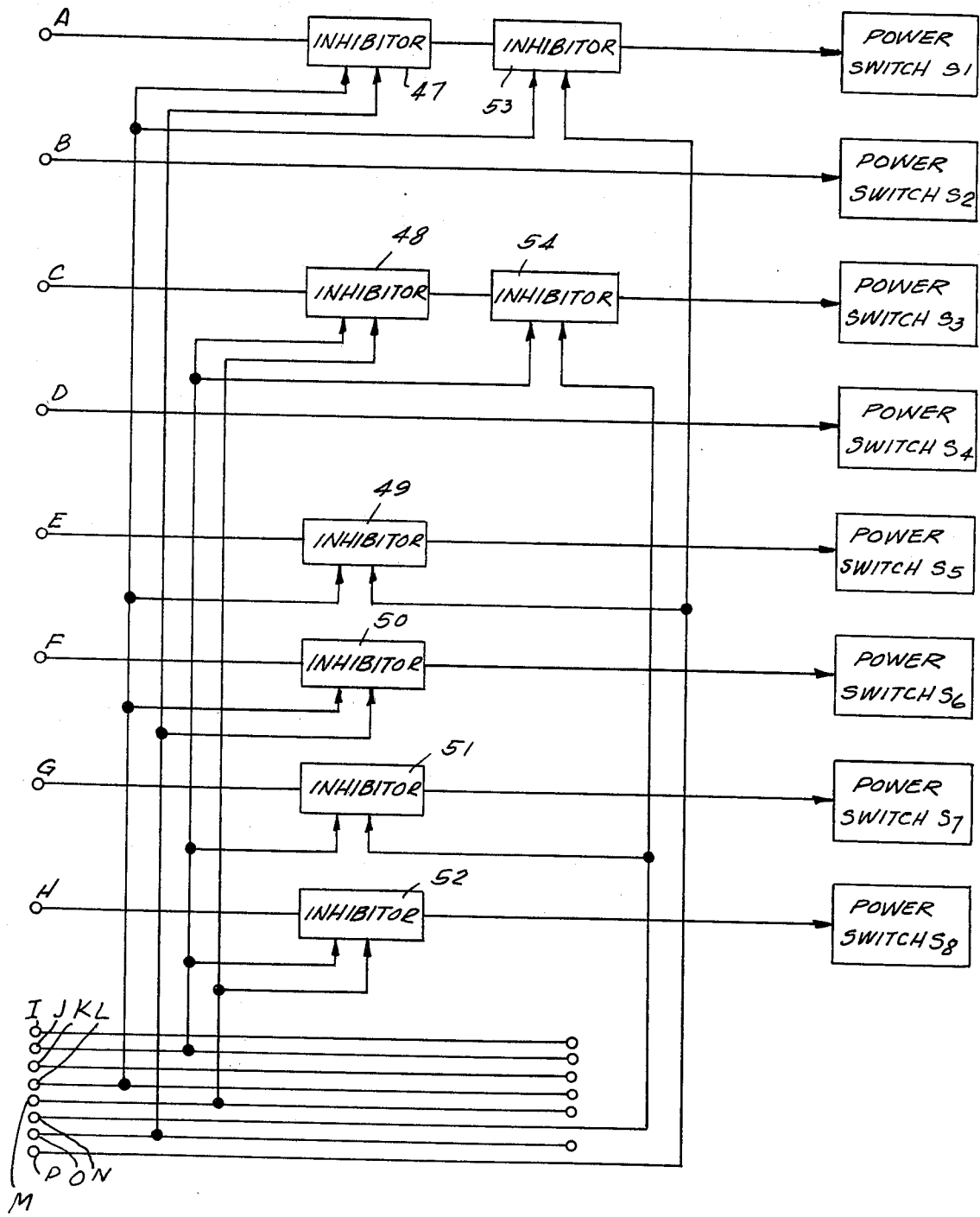

The direct current voltage from the source E is converted by the power switches in the circuit shown in FIG. 1 to an A.C. output voltage which is supplied to load 12 by the circuit of FIG. 1 and the structure of FIG. 2. The waveforms shown in FIG. 3 illustrate the operation of the static inverter.

FIG. 2 illustrates a pair of triangle sources 18 and 19 which are connected by lead 24. The triangle source 18 produces an output wave shape 56 as shown in FIG. 3a and triangle source 19 produces a wave shape 57 as shown in FIG. 3a which is 180° out of phase with the waveform 56. A pair of sinewave sources 21 and 22 are connected by lead 23 and produce output waveforms 58 and 59 as shown in FIG. 3. A feedback control 20 is connected to wave source 21 to control the amplitude S of sinewave sources 21 and 22. It should be particularly noted that sinewave source 22 has an output which is 90° behind the output of sinewave source 21. The triangle wave shapes 56 and 57 have six times frequency of the sinewave signals 58 and 59, as shown in FIG. 3a. It is also to be noted that the signals do not go through zero at the same time. The use of two sine waves spaced 90° from each other produce many more time control signals that would be available if using two sine waves in phase with each other.

A first comparator 26 receives an input from triangle source 18 and sinewave source 21. A second comparator 27 receives an input from triangle source 19 and sinewave source 21. A third comparator 28 receives an input from triangle source 18 and an input from sinewave source 22. A fourth comparator 29 receives an input from triangle source 19 and sinewave source 22. The output of comparator 26 is designated as 60 in FIG. 3b. It should be noted that wave shape 60 goes above and below zero reference voltage and a pair of diodes $D_5$ and $D_6$ receive the outputs from the operational amplifier and comparator 26 and are oppositely poled so as to allow the positive and negative portions of the waves 60 to pass. For example, the diode $D_5$ passes the positive portion of the wave which is indicated by numeral 64 in FIG. 3b. The diode $D_6$ passes the negative portion of the wave 60 which is indicated by numeral 66 in FIGS. 2a and 3a.

The comparator 27 produces the wave shape 61 shown in FIG. 3c at its output. It supplies this output to a pair of diodes $D_7$ and $D_8$. The diode $D_7$ is poled to pass the positive portion of wave 61 and the diode $D_8$ is poled to pass the negative portion of the wave. The positive portion is designated by numeral 67 and the negative portion is designated by numeral 68.

Comparator 28 produces an output wave 62 illustrated in FIG. 3d at its output. A pair of diodes which are oppositely poled $D_9$ and $D_{10}$ receive the output of the comparator 28 and respectively pass the positive and negative portions of the wave 62. The positive portion of the wave is designated as 69 and the negative portion is designated as 71, as illustrated in FIG. 3d.

The comparator 29 produces the waveform 63 at its output and supplies it to the opposite pole diodes $D_{11}$ and $D_{12}$. Diode $D_{11}$ is poled to pass the negative waveform 73 and diode $D_{12}$ is poled to pass the positive waveform 72.

A first group of inhibitors 31, 39, 47 and 53 are connected in series between the diode $D_5$ and power switch $S_1$ to turn it on and off. A pair of inhibitors 32 and 40 are connected in series between diode $D_7$ and power switch $S_2$. A group of inhibitors 33, 41, 48 and 54 are connected in series between diode $D_6$ and power switch $S_3$.

A pair of inhibitors 34 and 42 are connected in series between diode $D_8$ and power switch $S_4$. Inhibitors 35, 43 and 49 are connected in series between diode $D_9$ and power switch $S_5$. Inhibitors 36, 44, and 50 are connected in series between diode $D_{11}$ and power switch $S_6$. Inhibitors 37, 45 and 51 are connected in series between diode $D_{10}$ and power switch $S_7$. Inhibitors 38, 46 and 52 are connected in series between diode $D_{12}$ and power switch $S_8$.

Waveform 64 from diode $D_5$ is also connected to inhibitors 43, 44, 45, and 46. Waveform 67 is also connected to inhibitors 35, 36, 37, 38 52, 51, 48 and 54. Wave shape 66 is also supplied to inhibitors 35, 36, 37, and 38. Waveform 68 is also supplied to inhibitors 42, 43, 44, 45, 46, 50, 59, 47, and 53. Waveform 69 is also supplied to inhibitors 39, 40, 41, 52, and 48. Waveform 73 is also supplied to inhibitors 31, 32, 33, 34, 51, and 54. Waveform 71 is also supplied to inhibitors 31, 32, 33, 34, 50, and 47. Waveform 72 is also supplied to inhibitors 39, 40, 41, 42, 49, and 53.

It should be realized, of course, that the inhibitors provide logic circuitry for switching the power switches $S_1$ through $S_8$ on so that the inverter operates properly. The output of the inverter appearing across the load 12 is illustrated in FIG. 3f. It is to be noted that a plurality of positive pulses 80, 81, 82, 83, 84 and 85 and a plurality of negative pulses 74, 75, 76, 77, 78 and 79 are produced at the output of the inverter. The filter 16 smooths this output and supplies an alternating waveform to the load 12.

Table I illustrates the logic lockout sequence to prevent short circuits occurring across the voltage source E.

The inhibitors 31 through 54 allow an input signal to pass unless two voltages are present on the control leads. For example, inhibitor 31 will allow waveform 64 to pass unless voltages from waveforms 71 and 73 are both other than zero. The other inhibitors operate in a similar fashion.

The logic in Table I will be explained using FIGS. 1, 2 and 3 as a guide: The waveforms 60, 61, 62 and 63 in FIG. 3 are compared in the power bridge circuit in FIG. 1 resulting in a pulse width modulated waveform across the load as shown in FIG. 3f. This output voltage waveform is obtained as follows:

(1) Starting at zero the signals to power switches $S_1$, $S_2$, $S_5$ and $S_6$ are formed in the comparators of FIG. 2. These four signals are compared in the "inhibit" logic of FIG. 2 and are allowed to turn "on" their respective power switches $S_1$, $S_2$, $S_5$ and $S_6$. These switches do not apply any power to the load since they are all on the positive side of the source. They do, however, provide a reactive current path for the load and filter.

(2) Signal source 73 next switches to 72 with signals 64, 67, and 69 remaining the same. These four signals are compared in the "inhibit" logic of FIG. 2 resulting in no signals being applied to the power switches $S_1$ and $S_2$. This prevents a short circuit across the source through the path created by power switches $S_1$, $S_2$ and $S_8$.

(3) Signal source 64 next switches to 66 resulting in the switch signals 66, 67, 69 and 72. These four signals are compared in the "inhibit" logic of FIG. 2 resulting in no signals being applied to the power switches $S_3$ and $S_8$ No power is applied to the load. However, power switches $S_2$ and $S_5$ provide a reactive current path for the load current.

These switching sequences are continued as described above creating the voltage waveform in FIG. 3f across the filter and load. The complete switching sequence from FIG. 3—waveforms 60, 61, 62, and 63 are given for one full cycle of the output voltage to explain the circuit operation.

TABLE I

| Signal sources | Power switches | Output |
|---|---|---|
| 64-67-69-73 | S1-S2-S5-S6 | 0 |
| 64-67-69-72 | S5-S8 (Blanks S1, S2) | +1 |
| 66-67-69-72 | S2-S5 (Blanks S3, S8) | 0 |
| 66-67-69-72 | S5-S8 (Blanks S3, S4) | +1 |
| 66-68-71-72 | S3-S4-S7-S8 | 0 |
| 66-68-69-72 | S5-S8 (Blanks S3, S4) | +1 |
| 66-67-69-72 | S2-S5 (Blanks S3, S8) | 0 |
| 66-67-69-73 | S3-S2 (Blanks S5, S6) | −1 |
| 64-67-69-73 | S1-S2-S5-S6 | 0 |
| 66-67-69-73 | S3-S2 (Blanks S5, S6) | −1 |
| 66-67-69-72 | S2-S5 (Blanks S3, S8) | 0 |
| 66-67-71-72 | S3-S2 (Blanks S7, S8) | −1 |
| 66-68-71-72 | S3-S4-S7-S8 | 0 |
| 66-67-71-72 | S3-S2 (Blanks S7 S8) | −1 |
| 66-67-71-73 | S2-S6 (Blanks S3, S7) | 0 |
| 66-67-69-73 | S3-S2 (Blanks S5, S6) | −1 |
| 64-67-69-73 | S1-S2-S5-S6 | 0 |
| 66-67-69-73 | S3-S2 (Blanks S5, S6) | −1 |
| 66-67-71-73 | S2-S6 (Blanks S3, S7) | 0 |
| 66-68-71-73 | S7-S6 (Blanks S3, S4) | +1 |
| 66-68-71-78 | S3-S4-S7-S8 | 0 |
| 66-68-71-73 | S7-S6 (Blanks S3, S4) | +1 |
| 66-67-71-73 | S2-S6 (Blanks S3, S7) | 0 |
| 64-67-71-73 | S7-S6 (Blanks S1, S2) | +1 |
| 64-67-69-73 | S1-S2-S5-S6 | 0 |

The fundamental output voltage has a frequency that is twice the reference sinewave frequency of sinewaves 58 and 59 thus obtaining power frequency multiplication of two. Therefore, if an output frequency of 60 hertz is desired, then the reference signal wave frequency will be 30 hertz. This lower reference sinewave frequency allows a higher modulation index M to be obtained in a practical circuit that has finite switching times associated with the power switches $S_1$ through $S_4$ and $S_5$ through $S_8$. The modulation index M is defined as the ratio of the peak sine wave voltage of wave 58 to the peak voltage of wave 56.

A harmonic analysis by digital computer reveals that some power frequency harmonics are present along with the carrier frequency harmonics (see FIG. 4). As the modulation index M is reduced to zero the fundamental also reduces to zero linearly and it can be seen that output voltage regulation can be accomplished by controlling the modulation index M. Current limiting is obtained by reducing the modulation index M to a level slightly above zero since zero modulation index M will result in zero output. The filter 16 suppresses the carrier frequency harmonic spectrum. The power switches $S_1$ through $S_8$ have finite turn "on" and turn "off" times. These finite switching times limit the maximum modulation index M that can be obtained from a given frequency ratio N for a standard bridge circuit using four power switches and two pulse width modulation sampling. This limitation is reduced in the power frequency multiplication approach because of the increased "off" times associated with each power switch due to the lower frequency reference sinewave. The duty cycle for each power switch used in this quad pulse width modulated system is about half the duty cycle required for standard two pulse width modulated bridge inverters. Each power switch, however, still must be capable of carrying the full load peak current. Therefore, if power transistors are used as the power switching elements then their size must be selected for the peak current and the same size transistors will be used as those used for the standard two pulse width modulated bridge circuit. However, if silicon controlled rectifiers are used for the power switches, then the sizes will be comparatively smaller for the four pulse width modulation system described in this application because of the lower root means square current requirements. Faster switching times are also associated with smaller silicon controlled rectifiers resulting in less commutation loss and a more efficient circuit.

The power frequency multiplication system using quad pulse width modulator bridge inverter possesses all the above desirable qualities and has a relatively small logic requirement. This basic approach may be extended to V reference sinewave vector space sampling by spacing the reference sinewaves apart by an angle $\theta$ where $\theta$ is equal to 360° divided by two times V. V represents the vector space considered but does not include the complements of the reference sinewave since these are automatically accounted for by the triangle carrier vector and its complement. The frequency of the fundamental output voltage will be V times the reference sinewave frequency or $(F=V \times F$ reference). Therefore, if $V=3$ for six pulse width modulated inverter using three reference sinewave vectors, a vector spacing of 120° will result. An equivalent vector spacing of 120° will exist for the three complements if they are used, resulting in an overall vector spacing between all six vectors of $\theta=60°$. A total of twelve power switches would be required for this bridge circuit and the maximum absolute modulation index M can be made even larger for a practical circuit because of the increase in the "off" times associated with each power switch used in the six pulse width modulation approach. The frequency of the fundamental output voltage will be three times the reference sinewave frequency. To insure that a full complement of pulses is obtained the three reference sinewaves may be phase shifted by 90° with respect to the triangle carrier frequency vector and its complement. The duty cycle of each power switch will be about 70% compared with the quad pulse width modulated inverter system. However, the complexity of the logic will be increased in order to prevent short circuits across the source during the power switching sequence. Therefore, the complexity of the logic will dictate the practical limit of the V vector space sampling used.

Although minor modifications might be suggested by those versed in the art, it should be understood that I wish to embody within the scope of the patent warrented hereon all such modifications as reasonably and properly come within the scope of my contribution to the art.

I claim as my invention:

1. An inverter circuit for converting direct current to alternating current comprising, a D.C. power supply, a load, a first plurality of switches connected between one side of the load and one side of the power supply, a second plurality of switches connected between one side of the load and the other side of the power supply, a third plurality of switches connected between the other side of the load and the one side of the power supply, a fourth plurality of switches connected between the other side of the power supply and the other side of the load, control means connected to the first, second, third and fourth plurality of switches to control them to supply an alternating signal to the load, the control means including a first signal source producing a first plurality of signal waves of a first frequency, a second signal source producing a second plurality of signal waves of a second frequency, combining means receiving the first and second plurality of signal waves to produce four control signals for the first, second, third and fourth plurality of switches, and said control means includes a logic circuit for selectively closing the switches.

2. An inverter circuit for converting direct current to alternating current comprising, a D.C. power supply, a load, a first plurality of switches connected between one side of the load and one side of the power supply, a second plurality of switches connected between one side of the load and the other side of the power supply, a third plurality of switches connected between the other side of the load and the one side of the power supply, a fourth plurality of switches connected between the other side of the power supply and the other side of the load, control means connected to the first, second, third and fourth plurality of switches to control them to supply an alternating signal to the load, the control means including a first signal source producing a first pair of triangular shaped signal waves of a first frequency spaced 180° out of phase with each other, a second signal source producing a second pair of sinewave shaped signal waves of a second frequency spaced 90° with each other, and combining means receiving the first and second plurality of signal waves to produce four control signals for the first, second, third and fourth plurality of switches and the first frequency is higher than said second frequency.

3. A circuit according to claim 2 in which the outputs of the first signal source does not change polarity at the same time as the outputs of the second signal source.

4. A circuit according to claim 3 including first, second, third and fourth operational amplifiers each receiving inputs from the first and second signal sources and producing four gating waves.

5. A circuit according to claim 4 including a plurality of inhibitors receiving the four gating waves and connected to the first, second, third and fourth plurality of switches to actuate them.

6. A circuit according to claim 5, comprising first, second, third and fourth polarity sensing means connected between the first, second, third and fourth operational amplifiers and the inhibitors to produce eight polarity separated signals.

7. A circuit according to claim 6 wherein the plurality of inhibitors have input and output terminals and a pair of inhibit gating terminals.

8. A circuit according to claim 7 wherein the pair of inhibit gating terminals each receive one of the eight polarity separated signals.

9. A circuit according to claim 8 wherein a first eight of the inhibitors receive one of the eight polarity separated signals on their input terminals.

10. A circuit according to claim 9 wherein a second eight of the inhibitors have their output terminals connected to the first, second, third and fourth plurality of switches.

11. A circuit according to claim 10 wherein a third group of inhibitors are connected between the first and second group of eight inhibitors.

References Cited

UNITED STATES PATENTS

| | | | |
|---|---|---|---|
| 3,346,794 | 10/1967 | Stemmler | 321—9 XR |
| 3,400,334 | 9/1968 | Ross et al. | |
| 3,409,817 | 11/1968 | Gillett. | |

LEE T. HIX, Primary Examiner

W. M. SHOOP, Jr., Assistant Examiner

U.S. Cl. X.R.

321—45

UNITED STATES PATENT OFFICE
CERTIFICATE OF CORRECTION

Patent No. 3,510,749  Dated May 5, 1970

Inventor(s) ROBERT J. RESCH

It is certified that error appears in the above-identified patent and that said Letters Patent are hereby corrected as shown below:

Column 2, line 23, ". Power switches $S_3$ and $S_4$ are" should read --with its anode connected to--;

line 48, "that" should read --than--.

Column 3, line 34, "59" should read --49--.

Signed and sealed this 6th day of July 1971.

(SEAL)
Attest:

EDWARD M. FLETCHER, JR.
Attesting Officer

WILLIAM E. SCHUYLER, JR.
Commissioner of Patents